United States Patent

[11] 3,566,028

[72] Inventor Wouter Smeulers
Emmasingel, Eindhoven, Netherlands
[21] Appl. No. 768,355
[22] Filed Oct. 17, 1968
[45] Patented Feb. 23, 1971
[73] Assignee U.S. Philips Corporation
New York, N.Y.
[32] Priority Oct. 25, 1967
[33] Netherlands
[31] 6714456

[54] CIRCUIT ARRANGEMENT FOR SUPPRESSING NOISE IN A TELEVISION RECEIVER

6 Claims, 7 Drawing Figs.

[52] U.S. Cl. .................................................... 178/7.3
[51] Int. Cl. .................................................... H04n 5/21
[50] Field of Search ........................................ 178/7.3 (E), 7.5 (E), 6.8

[56] References Cited

UNITED STATES PATENTS

| | | | |
|---|---|---|---|
| 2,854,508 | 9/1958 | Janssen | 178/7.3E |
| 3,080,450 | 3/1963 | Zanarini | 178/7.3E |
| 2,785,303 | 3/1957 | Keizer et al. | 178/7.3E |
| 2,829,197 | 4/1958 | Scott | 178/7.3E |

*Primary Examiner*—Richard Murray
*Assistant Examiner*—Alfred H. Eddleman
*Attorney*—Frank R. Trifari

ABSTRACT: A video signal noise eliminator circuit features an active element such as tube or transistor biased at cutoff. Noise pulses which exceed the black level are applied to the element through a diode, and are amplified by the element. Noise pulses that are less than the black level are selected by a filter circuit and also applied to the element where they are rectified. The active element then supplies inverted noise pulses to a sync separator where they cancel the original noise pulses.

INVENTOR.
WOUTER SMEULERS
BY
Frank R. Trifari
AGENT

INVENTOR.
WOUTER SMEULERS
BY
Frank R. Trifari
AGENT

CIRCUIT ARRANGEMENT FOR SUPPRESSING NOISE IN A TELEVISION RECEIVER

The invention relates to a circuit arrangement for suppressing noise in the video signal in a television receiver which includes selecting means for extracting the information concerning the noise signals required for said suppression, said selecting means passing a broad frequency band of the video signal to be reproduced, the frequency band being located within the frequency band of the video signal and the maximum transmission factor of the selecting means being at least 3 times greater than the transmission factor of the selecting means at the frequencies of the first 20 harmonics of the line synchronizing pulses, the information regarding the noise signals being obtained by detection of the signal passed by the selecting means.

Such an arrangement is known from U.S. Pat. No. 2,885,474.

As has been described in this patent the video-frequency selection of the noise pulses has the advantage that there is no possibility of an incorrect tuning of the receiver with the result that either the first 20 harmonics of the synchronizing signals and the picture carrier or the associated sound carrier and signals originating from a television transmitter in an adjacent channel lie within the passband of said selecting means.

On the other hand it has been found that video-frequency selection is impossible if overdrive of one or more intermediate-frequency amplifier stages of the receiver occurs due to noise pulses having a strong amplitude. Said overdrive particularly occurs when using transistors as amplifier elements in intermediate-frequency stages.

It is, however, possible to select the noise pulses having a great amplitude by means of the so-called known amplitude-selective method. This may, for example, be effected by giving a diode or an amplifier element a certain bias, so that only the noise pulses having amplitudes greater than said bias will pass the diode or amplifier element and may then be used to suppress the noise pulses still present in the video signal. Said amplitude selective method (from now on called AS in contrast with the frequency-selective method, from now on called FS which operates with frequency-dependent selecting means) can, however, only be used for the video-frequency television signal because the DC level is laid down therein and consequently the aforementioned bias can be adjusted.

The AS method in itself has, however, the drawback that noise pulses having amplitudes smaller than the adjusted level cannot be extracted, whereas this is possible with the FS method, because this method is independent of an adjusted level.

It has been attempted to obviate this drawback of the AS method by synchronizing the said level with the amplitude of the video signal, for example, in the case of negative modulation with the peaks of the synchronizing pulses. However, for noise pulses having an amplitude which is smaller than the synchronizing pulses this method no longer works, whereas it is possible to extract such noise pulses by means of the FS method.

In order to obtain the advantages of both methods without many additional components being necessary, the circuit arrangement according to the invention is characterized in that noise extraction is effected by means of a diode in addition to noise extraction by means of said selecting means, and that the detection of the signal passed by the selecting means is effected by means of an amplifier element (anode or collector detection) substantially adjusted in class B, the video signal being applied both to one end of said selecting means and to an electrode of said diode, the remaining end of said selecting means and the other electrode of the diode being connected together and to a bias which determines the level at which the diode must become conducting if the noise pulse exceeds this level, a control electrode of the amplifier element being connected to the selecting means and this in such manner that there is a DC connection to the through connection of diode and selecting means.

It is to be noted that the amplifier element may perform a dual function by connecting together diode and selecting means and connecting the control electrode of the amplifier element to the selecting means in the manner as described above. In the FS method this element acts as a detector in the AS method as an amplifier. Consequently, without many additional elements being required the advantages of the video-frequency extraction of the noise pulse in accordance with the FS method can be maintained and the drawbacks relative to the intermediate-frequency extraction can be obviated.

In order that the invention may be readily carried into effect, it will now be described in detail, by way of example, with reference to the accompanying diagrammatic drawings in which.

Figures 1, 2, 3, 4, 5:
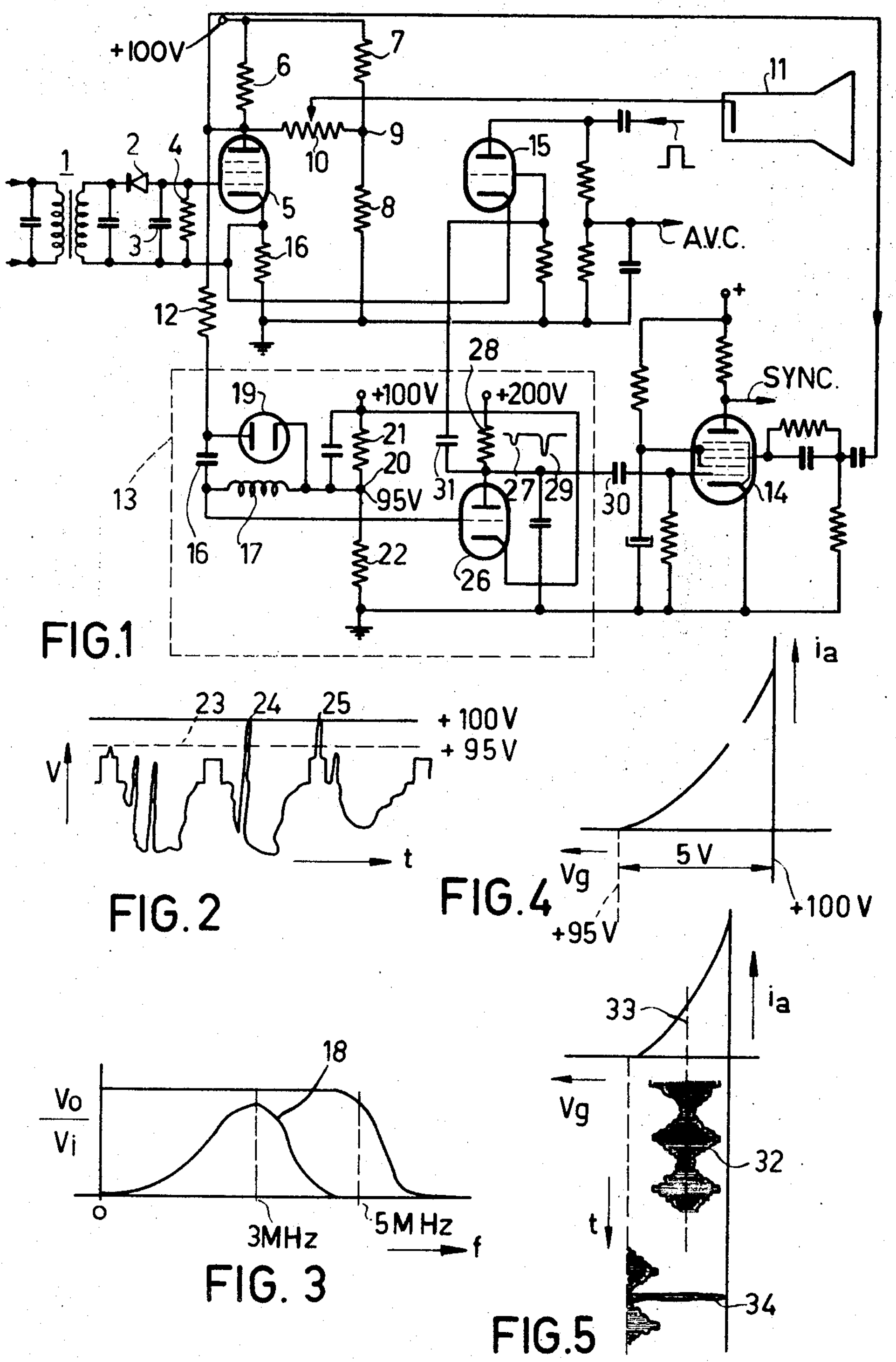
FIG. 1 shows a first embodiment using tubes.
FIG. 2 shows the detected television signal as it is applied to the noise-extraction means.
FIG. 3 shows a frequency characteristic both of the video-frequency amplifier and of the selecting means for extracting the noise signals in accordance with the FS method.
FIG. 4 shows a characteristic of the anode detector of FIG. 1.
FIG. 5 shows a characteristic of an intermediate-frequency amplifier stage for clarifying the phenomenon of the carrier dropping from the intermediate-frequency signal in case of video IF or detector overdrive.

In FIG. 1 the last intermediate-frequency transformer to which the intermediate-frequency television signal is applied is denoted by 1. This transformer is succeeded by a detection network consisting of a diode 2, a capacitor 3 and a resistor 4. The signal thus detected is applied to a control grid of the amplifier tube 5 which acts as an output stage of the video-frequency amplifier. An anode resistor 6 which, by way of example, is connected to a positive supply voltage of +100 is included in the anode line of this tube. A potentiometer consisting of a resistor 7 and resistor 8 is also connected to this supply voltage, said resistors being proportioned in such manner that the voltage at the anode of the tube 5 is the same as that at the junction 9 of the resistors 7 and 8 if the black level of the video signal applied to the control grid of the amplifier tube 5 prevails at this control grid. A potentiometer 10 the variable tap of which is connected to the cathode of display tube 11 is provided between the anode of the tube 5 and the junction 9. Since with the black level occurring, the voltage between the anode and the junction 9 is the same, the black level voltage will exist at the cathode of the display tube 11 irrespective of the position of the variable tap on the potentiometer 10. Consequently, the contrast can be controlled with the aid of the potentiometer 10 while keeping the black level constant.

Due to the said manner of contrast control, the amplitude of the signal at the anode of tube 5 will be independent of this contrast control. The video signal occurring at the anode and shown in FIG. 2 can now be applied to various points in the receiver. Thus, first, it is applied through resistor 12 to the noise extraction circuit 13 which, as will be described hereinafter, extracts the noise according to the principle of the invention. Furthermore, this signal is applied to a control grid of the synchronizing extractor 14, in which the synchronizing pulses are separated from the normal video signal. The separated synchronizing signals appear at the anode of the tube 14 and are indicated by SYNC in FIG. 1. Furthermore the circuit arrangement for generating the voltage for the automatic gain control (AGC) is indicated in FIG. 1 and includes, inter alia the tube 15, to the cathode of which the video signal is applied which is developed across the cathode resistor 16 of the video output tube 5. The control signal, which is indicated by AGC in FIG. 1, is derived from the output of the tube 15.

Both the circuit arrangement for extracting the synchronizing pulses and the circuit arrangement for generating the voltage for the automatic gain control operate in a manner known per se and need not therefore be described further.

The circuit arrangement for extracting the noise pulses 13 comprises the selecting means for passing the high frequencies from the total frequency band of the detected television signal. Said selecting means consist of a series circuit formed by a capacitor 16 and a coil 17 in FIG. 1. This series circuit is designed in such manner that its transfer function frequency characteristic has the form as shown by the curve 18 in FIG. 3. As is known the curve 18 must be such that the first 20 harmonics of the line-synchronizing pulses are substantially not passed on by this filter, but in any case the maximum passage by this filter must at least be 3 times as great as that of the first 20 harmonics. Said maximum passage is determined at 3 mc./sec. in the example of FIG. 1 if the total video-frequency band is approximately 5 mc./sec. This will, for example, be the case when using the circuit arrangement according to the invention which is suitable for the reception of television signals in accordance with the CCIR system, in which the highest modulation frequency of the video signal is approximately 5 mc./sec. It will be evident that the choice of 3 and 5 mc./sec. will be different if the circuit arrangement according to the invention is to be suitable for a different system. The form of the curve 18 will, however, substantially remain the same in the said video-frequency band.

The selecting means 16 and 17 are shunted by a diode 19, and this in such manner that its anode is connected to the point to which the video signal is applied through the resistor 12, while its cathode is connected to the junction 20 of a potentiometer consisting of the resistors 21 and 22, which potentiometer is likewise connected to the supply voltage of +100 v. The potentiometer 21, 22 is proportioned in such manner that a voltage of 95 v. prevails at the junction 20. SAid voltage of 95 v. performs two functions. Its first function is to determine the level above which the diode 19 must start to conduct. This may be clarified with reference to FIG. 2. In this FIG. the level of +95 v. is also shown by the broken line 23. This level lies just above the peaks of the synchronizing pulses in the video signal, and therefore noise pulses having an amplitude which is greater than this level, as is indicated, for example, by the pulses 24 and 25 in FIG. 2, will cause the diode 19 to conduct and will subsequently be applied through the coil 17 to the control grid of the tube 26.

The voltage of 95 v. also acts as a bias for the tube 26 the cathode of which is connected to the supply voltage of +100 v. Therefore, the tube 26 is substantially adjusted in class B and this tube acts as an anode detector for the FS method. This will further be described with reference to FIG. 4, in which the $i_a - V_g$ characteristic of the tube 26 is plotted. It can be seen from FIG. 4 that the voltage of +95 v. conforms to the cutoff voltage of the tube 26, while the voltage of +100 v. is the cathode voltage of this tube. If noise pulses occur which have an amplitude which is smaller than the level of the line 23, it will be possible to extract these noise pulses because the selecting means 16, 17 allow the part of the video signal determined by the curve 18 to pass, which passed oscillations will be detected by the tube 26 in accordance with the anode-detection method and will therefore be developed across the anode resistor 28 as negative going pulses 27. If on the other hand pulses 24 and 25 occur, the diode 19 will pass on these pulses, which then reach the control grid of the tube 26 through the cathode of this diode and the coil 17, and are therefor developed across anode resistor 28 as amplified pulses 29. For generating the pulses 29 the tube 26 operates as an amplifier element. This is possible because as soon as the diode 19 becomes conducting, the pulses then going in a positive direction will cause a current to flow through the tube 26 in the positive direction just from the cutoff point of this tube, and the pulses therefore, appear as a voltage across resistor 28.

The said manner of switching thus makes it possible to operate the tube 26 one time as an anode detector and the other time as an amplifier. This has the advantage that noise pulses 27 and 29 which are always extracted appear across the resistor 28 at a sufficiently great amplitude without an additional amplifier element being required, as in the case of the AS method.

The extracted noise pulses 27 and 29 are applied both to a capacitor 30 to a first control grid of the synchronization extractor 14, and through a capacitor 31 to the control grid of the tube 15 for generating the AGC voltage. The suppression of the noise signals which are present in the video signal and which video signal is applied to the tubes 14 and 15 is then effected in known manner and need not further be described.

It is only to be noted that the voltage for the automatic gain control ensures that the synchronizing pulses will always lie substantially close to the level of +95 v., so that it is ensured that the diode 19 will always pass noise pulses 24 and 25 which just exceed this level.

Although in the foregoing only a television signal has been taken into account which is modulated on the picture carrier in a negative sense, this is not strictly necessary for using the principle of the invention. If a signal is received which is modulated on the carrier in a positive sense, a level should be kept constant which corresponds to white peak. If again the voltage for the automatic gain control keeps this level constant which corresponds to the maximum possible amplitude of the carrier modulated in a positive sense, then noise pulses exceeding this level can again be extracted by the diode 19.

The fact that the noise pulses 24 and 25 cannot be extracted with the aid of the video-frequency FS method may be explained as follows. If a strong noise pulse occurs in the intermediate-frequency television signal, this may cause an overdrive of usually the last intermediate-frequency amplifier stage. Assuming the last intermediate-frequency amplifier tube the anode of which is connected with respect to AC to the last intermediate-frequency transformer $i$, to have an $i_a - V_g$ characteristic, as shown in FIG. 5, the intermediate-frequency television signal will be situated as shown by the signal 32 in FIG. 5 without noise being present. This signal oscillates about the average grid voltage of this intermediate-frequency amplifier, said average grid voltage being indicated by the broken line 33. If, for example, a strong noise pulse 34 occurs, then this will supply a large charge to the capacitor as a result of either a grid capacitor present, or as a result of a cathode capacitor due to the current then occurring, so that the total signal as shown in FIG. 5 is considerably moved to the left. In the first place this has the result that the picture carrier present in the signal is entirely suppressed. (Think, for example, of a normal sinusoidal modulated signal, in which the carrier disappears itself in case of 100 percent modulation, sidebands remaining only). Also in the case shown in FIG. 5 a kind of 100 percent modulation of the carrier will occur as a result of the occurring noise pulse 34 so that this carrier itself disappears. A further possibility which particularly plays a part when using transistors, is that overdrive of the anode or collector current may occur of an intermediate-frequency stage, mostly again the last stage. In fact, in case of a strong noise it may occur that the amplifier element becomes saturated (bottoming in a transistor so that the anode or collector current cannot increase further even if the noise amplitude in the driving signal still increases. In such a case, however, the noise having a great amplitude may be considered as a carrier for the actual carrier due to intermodulation in a preceding stage. This amplitude then varies as a function of the actual carrier signal. With the above-mentioned overdrive, this amplitude variation is not passed on, and hence, the actual carrier disappears.

This disappearance of the picture carrier itself results in the following.

As is known, a modulated signal can be written as $$(1+m\cos pt)A\cos\omega t = A\cos\omega t + \frac{A}{2}m\cos(\omega+p)t + \frac{A}{2}m\cos(\omega-p)t \quad (1)$$

wherein $(1 + m \cos pt)$ represents the signal which is to be modulated on a carrier of the form A $\cos\omega t$. The factor 1 represents the DC component of the signal to be modulated on the carrier, $\omega$ the angular frequency of the carrier, and $m$ the modulation factor. Furthermore it must apply that $\omega > p$.

In the relevant example, $\omega$ is, for example, the intermediate-frequency angular frequency, and it applies that $\omega = 2\pi\ 38.9$ mc./sec., while $p$ may become $2\pi\ 5$ mc./sec. at a maximum.

A nonlinear element having at least a square law characteristic is required for detection. For the output current $i_u$ of such a nonlinear element for which, for example, in FIG. 1, the diode 2 is used, we can thus write $i_u = \alpha + \beta V_d + \gamma V_d 2$ — (2)

$V_d$ now is the signal added to diode 2, which signal must be detected. Consequently, the signal represented by equation (1) may be filled in for $V_d$ ·Equation (2) then changes into $i_u = \alpha + \beta\Big(A\cos\omega t + \frac{Am}{2}\cos(\omega+p)t + \frac{Am}{2}\cos(\omega\text{-}p)t\Big) + \Big(A^2\cos^2\omega t + \frac{A^2m^2}{4}\cos^2(\omega+p)t + \frac{A^2m^2}{4}\cos^2(\omega\text{-}p)t + mA^2\cos\omega t\cdot\cos(\omega+p)t + A^2m\cos\omega t\cdot\cos(\omega\text{-}p)t + \frac{A^2}{2}m^2\cos(\omega+p)t\cdot\cos(\omega\text{-}p)t\Big)$ (3)

The output circuit of diode 2 includes the RC network consisting of capacitor 3 and resistor 4, which has such a time constant that only the frequencies $p$ can be followed. The output voltage $V_u$ across the network 3, 4, (with impedance $Z_u$) therefore does not include any signal components having angular frequencies of $\omega$ or higher. For this voltage we can therefore write:

$$V_u = i_u Z_u = \left(\alpha + \gamma\left(\frac{A^2}{2} + m^2\frac{A^2}{4} + mA^2\cos pt + \frac{A^2}{8}m^2\cos 2pt\right)\right)Zu \quad (4)$$

In this equation $$\frac{A^2}{2} + \frac{m^2A^2}{4}$$

represents the DC component, and $mA^2\cos pt$ represents the AC component. The term $$\frac{m^2A^2}{8}\cos 2pt$$

represents a distortion component having the double modulation frequency $p$ caused by the square law detection chosen in this case. In practice it will be ensured that this distortion component, which is yet already one-eighth of the desired component of the modulation frequency $p$, is as small as possible because the television signal is a partial single sideband signal so that this distortion component cannot occur for the higher modulation frequencies. This will therefore be omitted hereinafter.

The fact that the television signal is a partial single sideband signal furthermore means that the term $mA^2\cos pt$ for the high modulation frequencies only has half the amplitude. By providing the frequency characteristic of the intermediate-frequency amplifier of a TV receiver with a so-called Nyquist edge, the amplitudes for the high and low modulation frequencies are made equal again.

Since the filter 16, 17 has a frequency characteristic as shown by the curve 18 in FIG. 3, it will be evident that the DC component, $$\left(\alpha + \gamma\left(\frac{A^2}{2} + \frac{m^2A^2}{4}\right)Z_u\right. \quad (5)$$

as occurs in equation (4), will not be passed by this filter. In other words, the tube 26 switched as an anode detector receives a signal of the form $\gamma Z_u A^2 m\cos pt$. (6)

Of the amplitude terms $\gamma Z_u$, $A^2$m, $\gamma Z_u$ and $A$ are constants, and the modulation factor $m$ does not only comprise information regarding the higher video frequencies, but also the noise which has been introduced therein during the transmission of the television signal. Hence the noise detected from the signal in accordance with equation (6) appears at the output of tube 26.

It follows from the above that the anode detector 26 can only operate if a signal is applied in accordance with equation (6).

If as is shown with reference to FIG. 5, the carrier $A\cos\omega t$ drops out, then the equation (4) changes into $$V_u\left(\alpha + \gamma\frac{A^2m}{4}\right)Z_u \quad (7)$$

The term $m\cos pt$ no longer occurs in the equation (7), so that it will be evident that the anode detector 26 does not receive a signal at all if the diode 19 is not present. However, this noise is present as a peak in the detected video signal, as is shown by the pulse 24 and 25 in FIG. 2. That is to say that, a nose 34, as shown in the intermediate-frequency signal of FIG. 5, will occur after detection of a peak pulse 24 or 25 in the detected signal. Said peak pulse can be extracted with the aid of the diode 19, as is shown hereinbefore.

The above also shows that the extraction of such peak pulses having a great amplitude in the intermediate-frequency signal is possible in the FS method, because the sidebands remain after the carrier $A\cos\omega t$ drops out. Since the filter for the FS method on an intermediate-frequency basis exactly passes the sidebands, they are retained for the detection, and again, a noise signal can be extracted by this detection. In addition, in this method the simultaneous extraction of the noise pulses having a great amplitude by means of a diode is impossible because the level of the synchronizing pulses more or less strongly shifts, as is shown in FIG. 5. Said shift no longer matters after detection because the intermediate-frequency signal is always applied to the detector as an AC signal. In FIG. 1, this is effected, for example, through the intermediate-frequency transformer 1.

If it would be desirable, such peak noise could be extracted on the intermediate-frequency side by deriving a signal from a nondecoupled screen grid of an overdriven intermediate-frequency amplifier penthode as indicated in British Pat. No. 740,370. If, however, transistors are used in the intermediate-frequency part this method is impossible, too.

In the example of FIG. 1, a level is indicated of +95 v., while a level of + 100 v. is indicated in order to bring the voltages to the correct values in relation to the grid space of approximately 5 v. of the anode detector 26. It will, however, be evident that these levels are completely arbitrary, and that entirely different conditions apply when using transistors for example.

Figure 6:
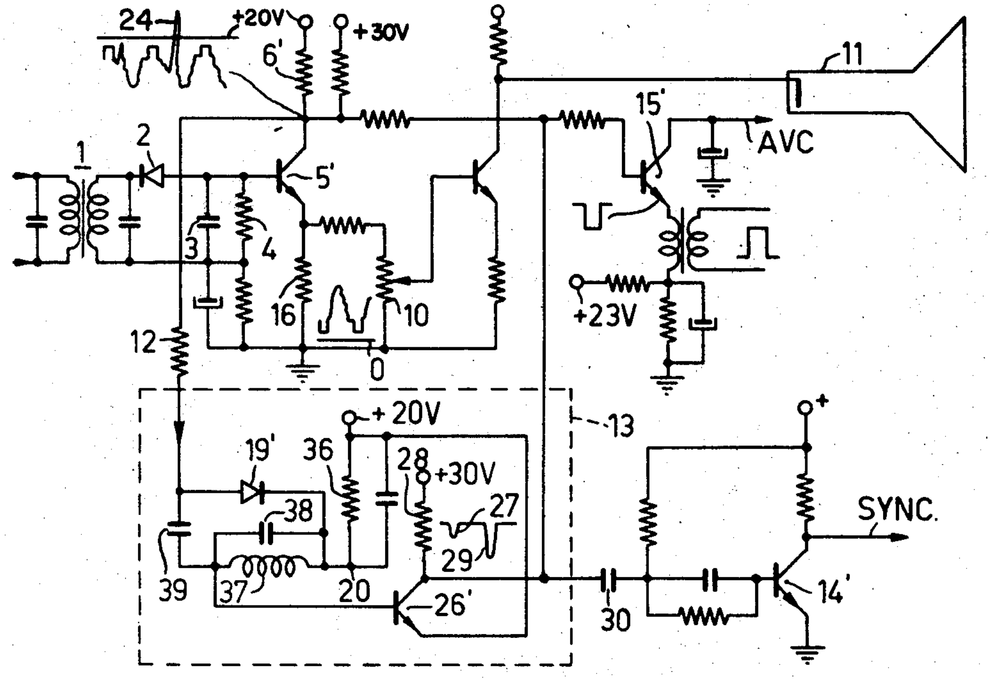
FIG. 6 shows a second embodiment using transistors.

Such an example using transistors is shown in the embodiment of FIG. 6, in which corresponding components are provided as much as possible with the same reference numerals as those of FIG. 1. Furthermore, components performing the same function in FIG. 6 and in FIG. 1 have the same reference numeral, but with the addition of an index. Thus, for example, the video amplifier 5' in FIG. 6 performs the same function as the tube 5 in FIG. 1. The same applies for the diode 19', which is designed as a semiconductor in FIG. 6 and as a tube in FIG. 1.

Otherwise the circuit arrangement of FIG. 6 functions in a corresponding manner as that of FIG. 1. Only the potentiometer 21, 22 has been eliminated and substituted by a single resistor 36. This is possible because the emitter-base operating region of a transistor is much smaller than that of a tube. Thus the transistor 26', which functions as a collector detector, can be adjusted in such manner that its emitter is applied to substantially the same voltage as its base. If, however, the transistor 26' is made from silicon, it may have a larger operating region, and it is again necessary to use a potentiometer.

Furthermore, the selecting means in the embodiment of FIG. 6 is not designed as a series circuit, as is indicated by the elements 16 and 17 in FIG. 1, but as a parallel circuit consisting of a coil 37 and a capacitor 38. The capacitor 39 now serves as a coupling capacitor, and it must also ensure that there is no DC connection between the point to which the video signal is applied through the resistor 12 and the point which is connected to the base of the transistor 26. It will be evident that the parallel circuit 37, 38 may perform the same function as the series circuit 16, 17.

In the embodiment of FIG. 6 there is the additional possibility of a peak noise, such as, for example, the one indicated by the noise peak 24, which cannot be handled by the selecting means 37, 38, and yet comprises a component of about 3 mc./sec. and hence, can be handled by the said selecting means 37, 38 if the signal is still at the base of transistor 5'. The fact that this component is no longer present in the collector circuit of the transistor 5' is the result of overdrive of this transistor. Such a case therefore occurs for noise having such a great amplitude that the last intermediate-frequency transistor is not yet overdriven, but the video driver 5' is.

The latter can be avoided by connecting the selecting means 37, 38 not through the capacitor 39 to the anode of the diode 19', but directly to the anode of the video detector 2. In fact, the polarity of the applied signal is not important for the selecting means 37, 38 (or 16, 17 in FIG. 1) since it concerns only AC voltage. A circuit arrangement is then obtained as is shown in FIG. 7, which otherwise is the same as that in FIG. 6.

Figure 7:
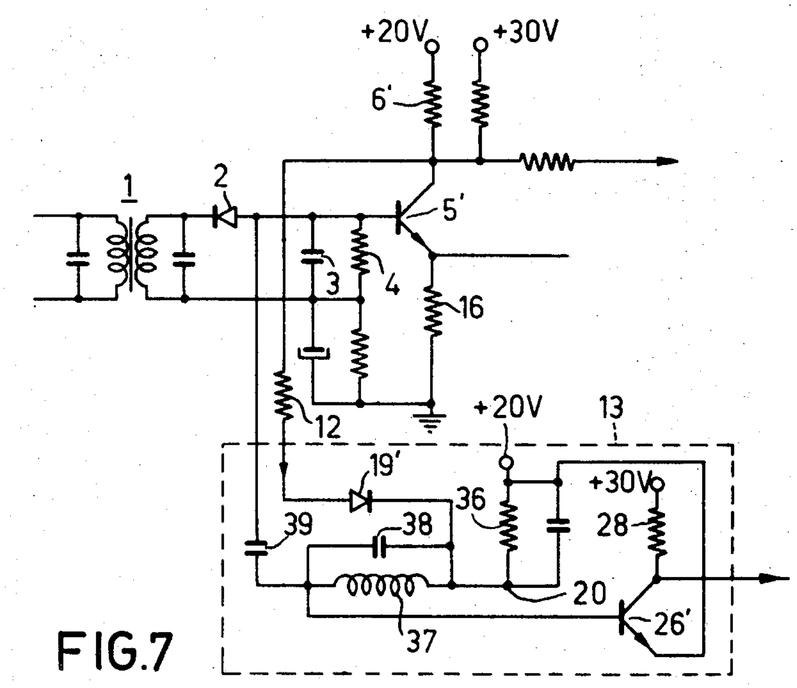
FIG. 7 shows an embodiment which is a slight modification of FIG. 6.

Finally, it is to be noted that although in the embodiments of FIGS. 1, 6 and 7 we have always started from a television signal modulated on the carrier in a negative sense, only few changes need be effected in the circuit arrangement for positive modulation. It may then, however, be appropriate that the voltage for the automatic gain control keeps a level constant which corresponds to the white peak. This may, for example, be effected by using an ordinary circuit arrangement as is shown in FIG. 6, but by superimposing a pulse just slightly exceeding white peak on the back porch of the line-synchronizing pulses, which back porch corresponds to a black level. The circuit arrangement for generating the AGC voltage will then again attempt to keep this superimposed pulse amplitude constant, and if it is ensured that the amplitude of the superimposed pulse is constant it will in fact adjust the black level to a constant value and hence the white peak.

Otherwise, it is of course alternatively possible to substitute all positive voltages for negative ones, but then at the same time to reverse the diodes 2, and 19' and to have transistors which are all of the PNP type.

I claim:

1. A noise suppression circuit comprising a source of signals containing noise pulses, an active element including control and output terminals, means coupled to said control terminal for biasing said active element substantially at cutoff, means for operating said active element as an amplifier including unidirectional conducting means for applying noise pulses which differ in potential from the bias level in one sense to said control terminal, means for operating said active element as a rectifier including frequency selection means for applying noise pulses which differ in potential from said bias level in an opposite sense to said one sense to said control terminal, and combining means coupled to said source and said output terminal.

2. A circuit as claimed in claim 1 wherein said signals comprise video signals having horizontal synchronizing pulses and a selected bandwidth, said unidirection conducting means comprises a diode, and said frequency selection means comprises a tuned circuit having a maximum transfer function at a frequency within said selected bandwidth and at least three times greater than the transfer function of said tuned circuit at the frequencies of the lowest twenty harmonics of said horizontal synchronization pulses.

3. A circuit as claimed in claim 1 wherein said frequency selection means comprises a direct current conducting element having two terminals, one of said terminals being coupled to said biasing means, the remaining terminal being coupled to said control terminal.

4. A circuit as claimed in claim 1 wherein said unidirectional conducting means and said frequency selection means are parallel coupled together.

5. A circuit as claimed in claim 1 wherein said signals comprise negatively modulated video signals having synchronizing pulses, further comprising means for automatically keeping the amplitude of said synchronizing pulse substantially constant, and means for applying noise pulses which exceed in amplitude said synchronization pulses to said active element including means for applying all of said noise pulses to said unidirectional means.

6. A circuit as claimed in claim 1 wherein said selection means comprises a serially connected coil and capacitor, said control terminal being connected to the junction of said coil and capacitor, the remaining end of said capacitor being connected to said source, and the remaining end of said coil being connected to said biasing means.